(12) United States Patent
Choi et al.

(10) Patent No.: US 7,791,692 B2
(45) Date of Patent: Sep. 7, 2010

(54) TFT ARRAY PANEL HAVING A FIRST PIXEL REGION HAVING FIRST TRANSMISSIVE WITH FIRST AND THIRD REFLECTIVE ELECTRODES AND A SECOND PIXEL REGION HAVING SECOND TRANSMISSIVE WITH SECOND AND FOURTH REFLECTIVE ELECTRODES WHERE THE AREA RATIOS OF THE FIRST AND THIRD REFLECTIVE ELECTRODES TO THE SECOND AND FOURTH REFLECTIVE ELECTRODES ARE DIFFERENT

(75) Inventors: Jeong-Ye Choi, Hwaseong-si (KR); Sang-Il Kim, Yongin-si (KR); Mun-Pyo Hong, Seongnam-si (KR); Young-Chol Yang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1130 days.

(21) Appl. No.: 11/445,817

(22) Filed: Jun. 2, 2006

(65) Prior Publication Data
US 2006/0290848 A1    Dec. 28, 2006

(30) Foreign Application Priority Data
Jun. 27, 2005 (KR) ........................ 10-2005-0055599

(51) Int. Cl.
*G02F 1/1335* (2006.01)
(52) U.S. Cl. ........................ 349/114; 349/109
(58) Field of Classification Search .............. 349/114, 349/117, 109
See application file for complete search history.

(56) References Cited

U.S. PATENT DOCUMENTS 6,909,479 B2 * 6/2005 Iijima .......................... 349/109
7,180,560 B2 * 2/2007 Chuang et al. ............... 349/114
2005/0219446 A1 * 10/2005 Hisatake ...................... 349/114

FOREIGN PATENT DOCUMENTS

| CN | 1402065 | 3/2003 |
|---|---|---|
| CN | 1466010 | 1/2004 |
| CN | 1492263 | 4/2004 |
| EP | 0562120 | 9/1993 |
| WO | 2004057411 | 7/2004 |

* cited by examiner

*Primary Examiner*—John Heyman
(74) *Attorney, Agent, or Firm*—Cantor Colburn LLP

(57) ABSTRACT

The present invention provides a thin film transistor ("TFT") array panel including a substrate, first and second transmissive electrodes formed on the substrate, first and second reflective electrodes connected to the first and second transmissive electrodes, respectively, and third and fourth reflective electrodes separated from the first and second transmissive electrodes and the first and second reflective electrodes. A first area ratio of the first and third reflective electrodes is different from a second area ratio of the second and fourth reflective electrodes. A liquid crystal display ("LCD") includes the TFT array panel, and a method is provided for coinciding voltage-reflection curves of adjacent pixels in the LCD.

11 Claims, 13 Drawing Sheets

US 7,791,692 B2

TFT ARRAY PANEL HAVING A FIRST PIXEL REGION HAVING FIRST TRANSMISSIVE WITH FIRST AND THIRD REFLECTIVE ELECTRODES AND A SECOND PIXEL REGION HAVING SECOND TRANSMISSIVE WITH SECOND AND FOURTH REFLECTIVE ELECTRODES WHERE THE AREA RATIOS OF THE FIRST AND THIRD REFLECTIVE ELECTRODES TO THE SECOND AND FOURTH REFLECTIVE ELECTRODES ARE DIFFERENT

The present application claims priority to Korean Patent Application No. 2005-0055599, filed on Jun. 27, 2005 and all the benefits accruing therefrom under 35 U.S.C. §119, and the contents of which in its entirety are herein incorporated by reference.

BACKGROUND OF THE INVENTION (a) Field of the Invention

The present invention relates to a thin film transistor ("TFT") array panel, a liquid crystal display ("LCD") having the TFT array panel, and a method thereof, and more particularly the present invention relates to a TFT array panel having a transflective TFT, an LCD including the TFT array panel, and a method of operating the LCD.

(b) Description of the Related Art

LCDs are one of the most widely used flat panel displays. An LCD includes a liquid crystal ("LC") layer interposed between two panels each provided with field-generating electrodes. The LCD displays images by applying voltages to the field-generating electrodes to generate an electric field in the LC layer that determines orientations of LC molecules in the LC layer to adjust polarization of incident light. The light having adjusted polarization is either intercepted or allowed to pass by a polarizing film, thereby displaying images.

Depending on the light sources employed by the LCD, LCDs are classified as a transmissive LCD and a reflective LCD. The light source of the transmissive LCD is a backlight, and the light source of the reflective LCD is an external light. The reflective type of LCD is usually applied to a small or mid size display device.

A transflective LCD has been under development. The transflective LCD uses both a backlight and an external light as the light sources depending on circumstances, and are usually applied to small or mid size display devices. The transflective LCD includes a transmissive region and a reflective region in a pixel. While light passes through an LC layer only once in the transmissive region, light passes through the LC layer twice in the reflective region. Accordingly, gamma curves of the transmissive region and the reflective region are not coincident, and images are displayed differently between the transmissive region and the reflective region.

To solve this problem, the LC layer may be formed to have different thicknesses (cell gaps) between the transmissive region and the reflective region. Alternatively, the transflective LCD may be driven by two different driving voltages depending on whether the LCD is in a transmissive mode or a reflective mode.

However, when the two cell gap structure is applied, a thicker layer is required to be formed on the reflective region, thereby complicating the manufacturing process. Furthermore, since a high step is formed between the transmissive region and the reflective region, the LC molecules are aligned in a disorderly manner around the high step, thereby causing disclination in an image. Also, brightness reversion may occur in a high voltage range. On the other hand, when the method using two different driving voltages is applied, gamma curves cannot be coincident due to the inconsistency between critical voltages for transmissive brightness and reflective brightness.

BRIEF SUMMARY OF THE INVENTION

Exemplary embodiments of the present invention provide an LCD having gamma curves for the reflective mode and the transmissive mode coinciding with each other while achieving a substantially uniform cell gap.

In an exemplary embodiment of the present invention, a thin film transistor ("TFT") array panel includes a substrate, first and second transmissive electrodes formed on the substrate, first and second reflective electrodes connected to the first and second transmissive electrodes, respectively, and third and fourth reflective electrodes separated from the first and second transmissive electrodes and the first and second reflective electrodes, wherein a first area ratio of the first and third reflective electrodes is different from a second area ratio of the second and fourth reflective electrodes.

The total size of the first and third reflective electrodes may be substantially equal to a total size of the second and fourth reflective electrodes.

The TFT array panel may further include a third transmissive electrode formed on the substrate, a fifth reflective electrode connected to the third transmissive electrode, and a sixth reflective electrode separated from the third transmissive electrode and the fifth reflective electrode, wherein an area ratio of the fifth reflective electrode and the sixth reflective electrode is different from the first and second area ratios.

The total size of the fifth and sixth reflective electrodes may be substantially equal to a total size of the first and third reflective electrodes and the second and fourth reflective electrodes.

At least one of the transmissive electrodes, the first reflective electrode, and a first conductor connected to the transmissive electrodes and the first reflective electrode may overlap the third reflective electrode or a second conductor connected to the third reflective electrode.

The TFT array panel may further include an insulating layer formed between the transmissive electrodes and the third reflective electrode.

The TFT array panel may further include a first insulating layer formed between the first and second conductors overlapping each other.

The TFT array panel may further include a second insulating layer formed between the first and third reflective electrodes and the first conductor.

The TFT array panel may further include an insulating layer formed between the first and third reflective electrodes overlapping each other.

The first transmissive electrode, the first reflective electrode, and the third reflective electrode may be formed within a first pixel region, and the second transmissive electrode, the second reflective electrode, and the fourth reflective electrode may be formed within a second pixel region.

A data voltage may be applied to the first and second reflective electrodes, and a voltage lower than the data voltage may be applied to the third and fourth reflective electrodes.

A height of the thin film transistor array panel in a transmissive region and in a reflective region may be substantially constant.

In further exemplary embodiments of the present invention, a liquid crystal display ("LCD") having a plurality of pixels is provided and each pixel includes a transmissive liquid crystal ("LC") capacitor, a first reflective LC capacitor connected to the transmissive LC capacitor, and a second reflective LC capacitor separated from the transmissive LC capacitor and the first reflective LC capacitor, wherein the pixels have a first pixel and a second pixel, the first and second pixels representing colors that are different from each other, and a voltage-reflection curve of the first pixel substantially coincides with a voltage-reflection curve of the second pixel.

A voltage-transmittance curve of the first pixel may substantially coincide with a voltage-reflection curve of the first pixel.

A voltage across the second reflective LC capacitor may be smaller than a voltage across the first reflective LC capacitor.

The LCD may further include an auxiliary capacitor connected to each second reflective LC capacitor of each pixel.

The capacitances of the auxiliary capacitors of the first and second pixels may be different from each other.

The LCD may further include a switching element connected to the transmissive LC capacitor, the first reflective LC capacitor, and the auxiliary capacitor.

The transmissive LC capacitor and the first reflective LC capacitor may receive a data voltage from the switching element, and the second reflective LC capacitor receives a voltage that is smaller than the data voltage via the auxiliary capacitor.

The transmissive LC capacitor and the first reflective LC capacitor may include a transmissive electrode and a first reflective electrode connected to the switching element, respectively, and the second reflective LC capacitor comprises a second reflective electrode that is separated from the transmissive electrode and the first reflective electrode.

An area ratio of the first and second reflective electrodes of the first pixel may be different from an area ratio of the first and second reflective electrodes of the second pixel. A total area of the first and second reflective electrodes of the first pixel may be substantially same as a total area of the first and second reflective electrodes of the second pixel.

The pixels may have red, green, and blue pixels, representing red, green, and blue colors, respectively, a first area ratio of the first and second reflective electrodes of the red pixel is smaller than a second area ratio of the first and second reflective electrodes of the green pixel, and a third area ratio of the first and second reflective electrodes of the blue pixel is larger than the second area ratio of the first and second reflective electrodes of the green pixel.

The colors may include red, green, and blue colors.

A cell gap between a common electrode panel and a thin film transistor array panel of the LCD may be substantially uniform.

In further exemplary embodiments of the present invention, a method of coinciding voltage-reflection curves of adjacent pixels in a transflective LCD includes arranging a transmissive electrode and first and second reflective electrodes within each pixel of the LCD, providing the first and second reflective electrodes of each pixel within a substantially same total area, and differentiating area ratios between the first and second reflective electrodes of each pixel depending on a color of a color filter associated with each pixel.

Differentiating area ratios may include providing a second reflective electrode of each blue pixel with a larger area than a second reflective electrode of each green pixel, and providing a second reflective electrode of each green pixel with a larger area than a second reflective electrode of each red pixel.

The method may further include providing a data voltage to the transmissive electrode and the first reflective electrode of each pixel, and providing a voltage smaller than the data voltage to the second reflective electrode of each pixel.

The method may further include providing a substantially uniform cell gap between transmissive regions and reflective regions of the liquid crystal display.

BRIEF DESCRIPTION OF THE DRAWINGS

The above and other advantages of the present invention will become more apparent by describing exemplary embodiments thereof with reference to the accompanying drawings, in which.

DETAILED DESCRIPTION OF THE INVENTION

Figure 1:
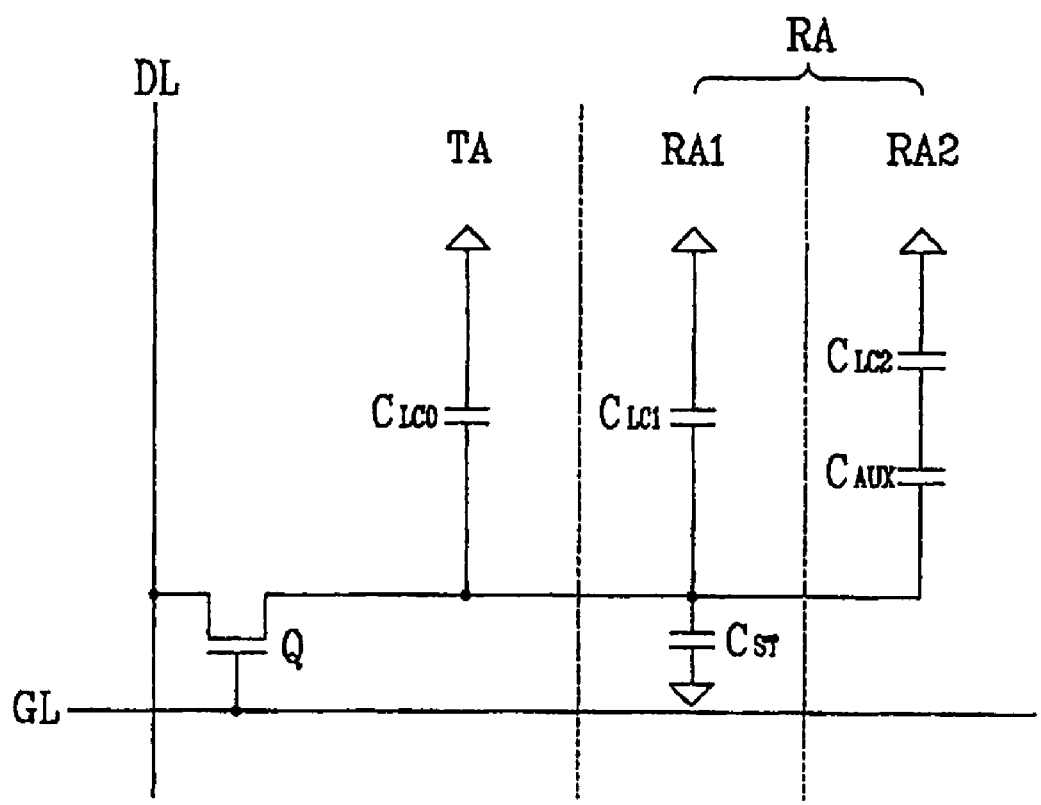
FIG. 1 is an equivalent circuit diagram of an exemplary LCD according to an exemplary embodiment of the present invention.

Preferred embodiments of the present invention will now be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of layers, films, and regions are exaggerated for clarity. Like numerals refer to like elements throughout. It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
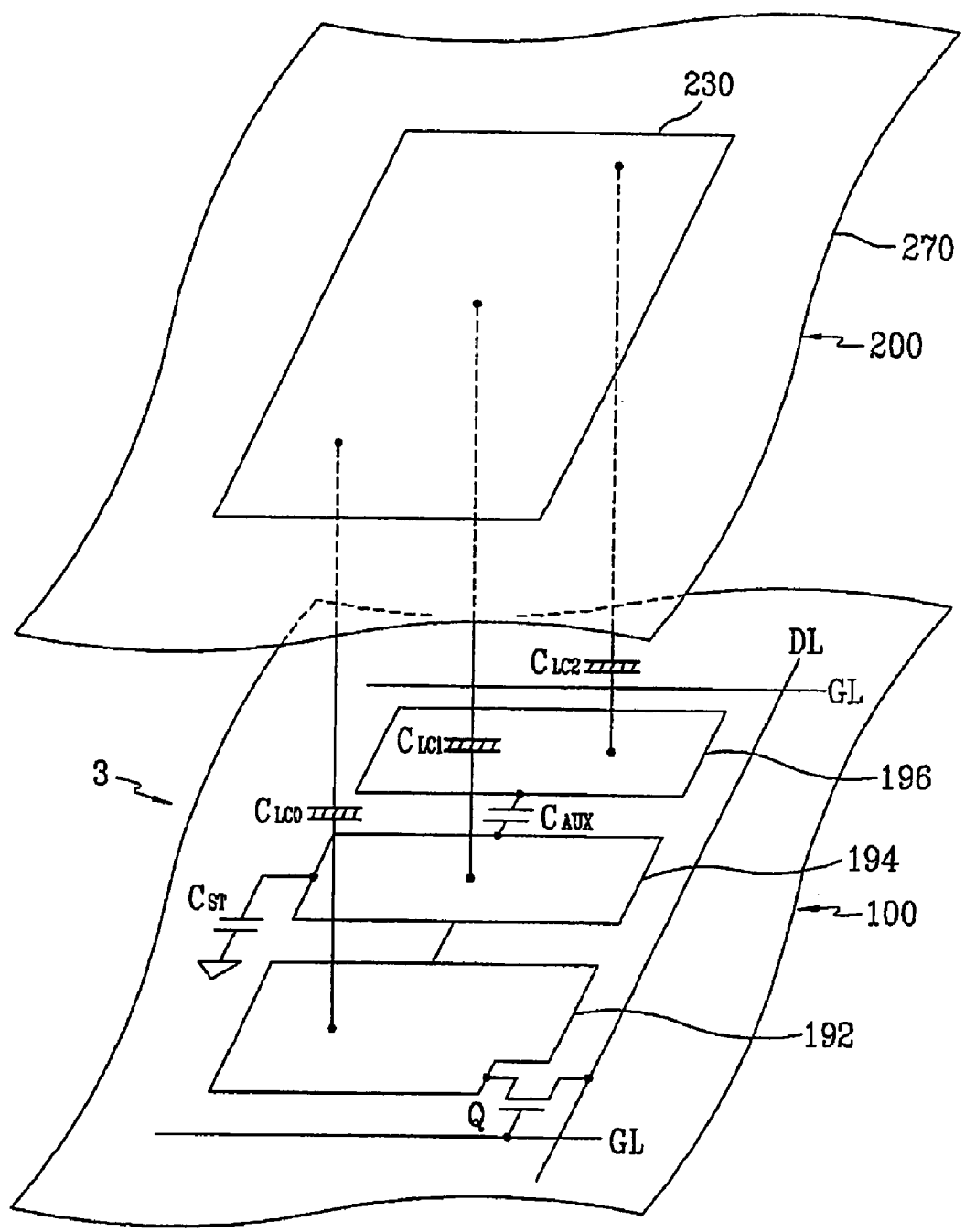
FIG. 2 is an equivalent circuit diagram of an exemplary pixel of an exemplary LCD according to an exemplary embodiment of the present invention.

FIG. 1 is an equivalent circuit diagram of an exemplary LCD according to an exemplary embodiment of the present invention, and FIG. 2 is an equivalent circuit diagram of an exemplary pixel of an exemplary LCD according to an exemplary embodiment of the present invention.

An LCD according to an exemplary embodiment of the present invention includes a plurality of display signal lines GL and DL, and a plurality of pixels connected thereto and arranged substantially in a matrix format in a circuital view shown in FIGS. 1 and 2, where only one pixel is shown for clarity. In addition, the LCD includes a TFT array panel 100, a common electrode panel 200 facing the TFT array panel 100, and a liquid crystal layer 3 interposed between the two panels 100 and 200.

The display signal lines GL and DL are provided on the TFT array panel 100 and include a plurality of gate lines GL for transmitting gate signals (also referred to as "scanning signals") from a gate driver (not shown) to switching elements Q within each pixel, and a plurality of data lines DL for transmitting data signals from a data driver (not shown) to switching elements Q within each pixel. The gate lines GL extend substantially in a row direction and substantially parallel to each other, while the data lines DL extend substantially in a column direction and substantially parallel to each other. Thus the gate lines GL extend substantially perpendicular to the data lines DL.

Each pixel includes the switching element Q connected to the gate lines GL and the data lines DL, a transmissive LC capacitor $C_{LC0}$, a first reflective LC capacitor $C_{LC1}$, an auxiliary capacitor $C_{AUX}$, a storage capacitor $C_{ST}$, and a second reflective LC capacitor $C_{LC2}$ connected to the auxiliary capacitor $C_{AUX}$. The storage capacitor $C_{ST}$ may be omitted.

The switching element Q, such as a thin film transistor ("TFT"), is provided within each pixel on the TFT array panel 100 and has three terminals: a control terminal (gate electrode) connected to one of the gate lines GL; an input terminal (source electrode) connected to one of the data lines DL; and an output terminal (drain electrode) connected to the transmissive LC capacitor $C_{LC0}$, the first reflective LC capacitor $C_{LC1}$, the auxiliary capacitor $C_{AUX}$, and the storage capacitor $C_{ST}$.

Referring to FIG. 2, the transmissive LC capacitor $C_{LC0}$ includes a transmissive electrode 192 provided on the TFT array panel 100 and a common electrode 270 provided on the common electrode panel 200, as two terminals. The LC layer 3 is disposed between the two electrodes 192 and 270 and functions as a dielectric of the transmissive LC capacitor $C_{LC0}$. The transmissive electrode 192 is connected to the output terminal of the switching element Q, and the common electrode 270 is supplied with a common voltage Vcom and covers an entire surface, or substantially the entire surface, of the common electrode panel 200. In an alternative embodiment, the common electrode 270 may be provided on the TFT array panel 100, and both electrodes 192 and 270 may have shapes of bars or stripes.

The first reflective LC capacitor $C_{LC1}$ includes a first reflective electrode 194 provided on the TFT array panel 100 and the common electrode 270 as two terminals. The LC layer 3 disposed between the two electrodes 194 and 270 functions as a dielectric of the first reflective LC capacitor $C_{LC1}$. The first reflective electrode 194 is connected to the output terminal of the switching element Q via the transmissive electrode 192.

The second reflective LC capacitor $C_{LC2}$ includes a second reflective electrode 196 provided on the TFT array panel 100 and the common electrode 270, as two terminals. The LC layer 3 disposed between the two electrodes 196 and 270 functions as a dielectric of the second reflective LC capacitor $C_{LC2}$. The second reflective electrode 196 is connected to the auxiliary capacitor $C_{AUX}$, but is electrically separated from the transmissive electrode 192 and the first reflective electrode 194.

The auxiliary capacitor $C_{AUX}$ includes the second reflective electrode 196 or a conductor (not shown) connected to the second reflective electrode 196, and one of the transmissive electrode 192, the first reflective electrode 194, and a conductor (not shown) connected thereto, which overlaps the second reflective electrode 196 or the conductor connected to the second reflective electrode 196 via an insulator. Exemplary embodiments of the auxiliary capacitor $C_{AUX}$ will be further described below.

The difference between the data voltage that is applied via the switching element Q corresponding to an image signal and the common voltage Vcom is represented as a voltage across the transmissive LC capacitor $C_{LC0}$ and the first reflective LC capacitor $C_{LC1}$, which are referred to as pixel voltages, respectively.

The pixel voltage is applied between the second reflective LC capacitor $C_{LC2}$ and the auxiliary capacitor $C_{AUX}$, and the second reflective LC capacitor $C_{LC2}$ and the auxiliary capacitor $C_{AUX}$ divide the pixel voltage. Thereby, a voltage across the second reflective LC capacitor $C_{LC2}$ is smaller than the pixel voltage.

The LC molecules in the LC capacitor $C_{LC}$ have orientations depending on the magnitude of the pixel voltage, and the molecular orientations determine the polarization of light passing through the LC layer 3. Polarizer(s), such as polarizer(s) disposed on outer surfaces of the TFT array panel 100 and/or the common electrode panel 200, convert the light polarization into the light transmittance such that the pixels PX display the luminance represented by the image data DAT.

The auxiliary capacitor $C_{AUX}$ divides the voltage applied between the common electrode 270 and the first reflective electrode 194 or the transmissive electrode 192 along with the second reflective LC capacitor $C_{LC2}$. Accordingly, the voltage applied to the second reflective LC capacitor $C_{LC2}$ is smaller than the voltage applied to the first reflective LC capacitor $C_{LC1}$.

A transflective LCD according to an exemplary embodiment of the present invention includes a plurality of transmissive regions TA and a plurality of first and second reflective regions RA1 and RA2, where each pixel region includes a transmissive region TA and a first and second reflective region RA1 and RA2. Each of the transmissive regions TA is defined by the transmissive electrode 192, and each of the first and second reflective regions RA1 and RA2 are defined by the first and second reflective electrodes 194 and 196, respectively. Portions at which the transmissive electrodes 192 are disposed under or over exposed portions, respectively, are transmissive regions TA, and portions disposed under or over the first and second reflective electrodes 194 and 196 are the first and second reflective regions RA1 and RA2, respectively.

In the transmissive regions TA, light from a backlight unit (not shown) disposed under the TFT array panel 100 passes through the TFT array panel 100 and then once through the LC layer 3 to display desired images. In the first and second reflective regions RA1 and RA2, external light such as sunlight is incident on the common electrode panel 200 and passes through it and the LC layer 3 to reach the first and second reflective electrodes 194 and 196. Then, the external light is reflected by the first and second reflective electrodes 194 and 196 and passes through the LC layer 3 again. Thus, the light passes through the LC layer 3 twice in the first and second reflective regions RA1 and RA2.

The storage capacitor $C_{ST}$ is an auxiliary capacitor for the LC capacitors $C_{LC0}$, $C_{LC1}$, and $C_{LC2}$. The storage capacitor $C_{ST}$ includes the transmissive electrode 192 or the first reflective electrode 194 and a storage electrode (not shown), which is provided on the TFT array panel 100, overlaps the transmissive electrode 192 or the first reflective electrode 194 via an insulator formed there between, and is supplied with a predetermined voltage such as a common voltage Vcom. Alternatively, the storage capacitor $C_{ST}$ includes the transmissive electrode 192 or the first reflective electrode 194 and an adjacent gate line called a previous gate line, which overlaps the transmissive electrode 192 or the first reflective electrode 194 via an insulator formed there between.

Next, the layered structures of an exemplary LCD according to exemplary embodiments of the present invention will be described with reference to FIGS. 3 to 5.

Figure 3:
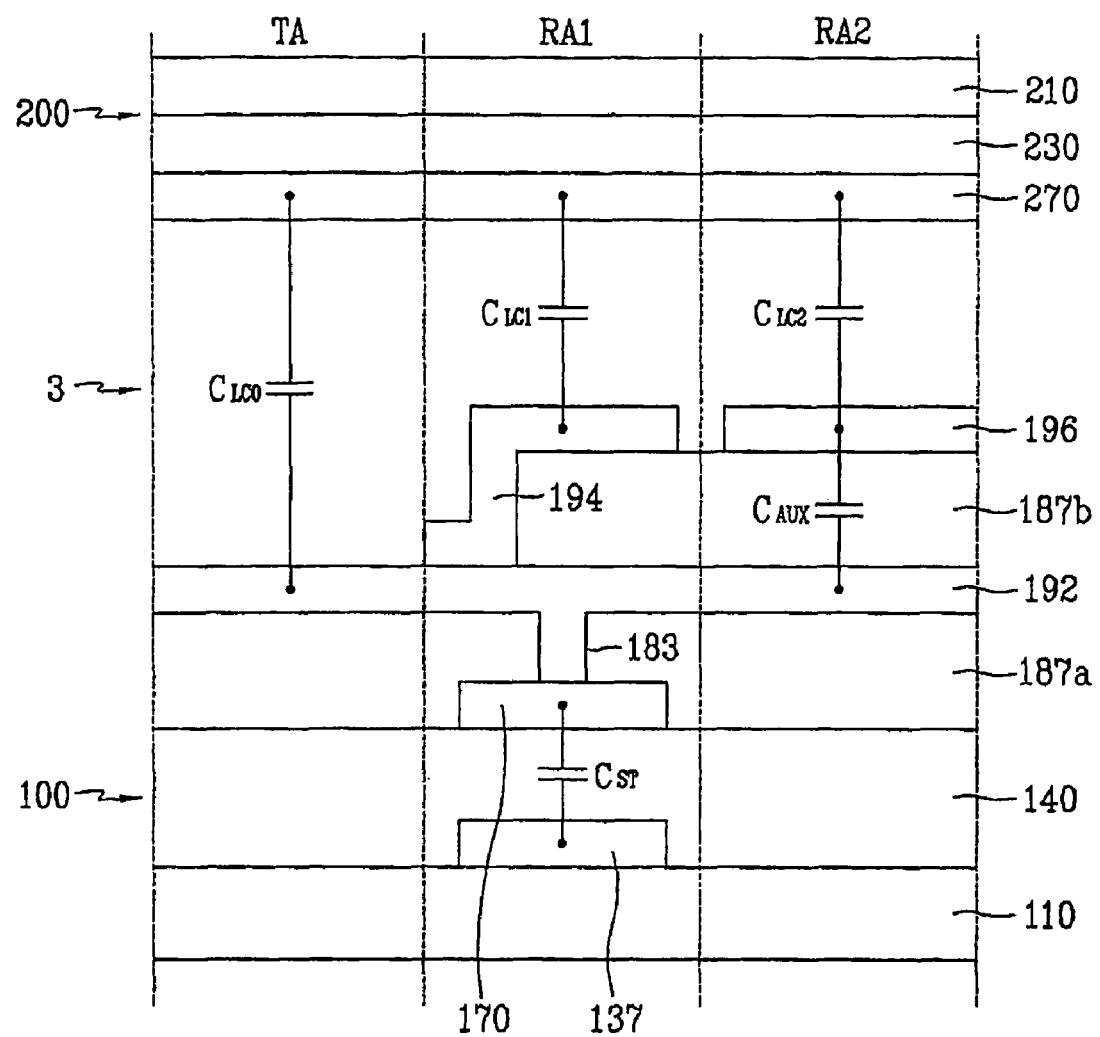
FIG. 3 is an exemplary sectional view of the exemplary LCD shown in FIG. 2.
Figure 4:
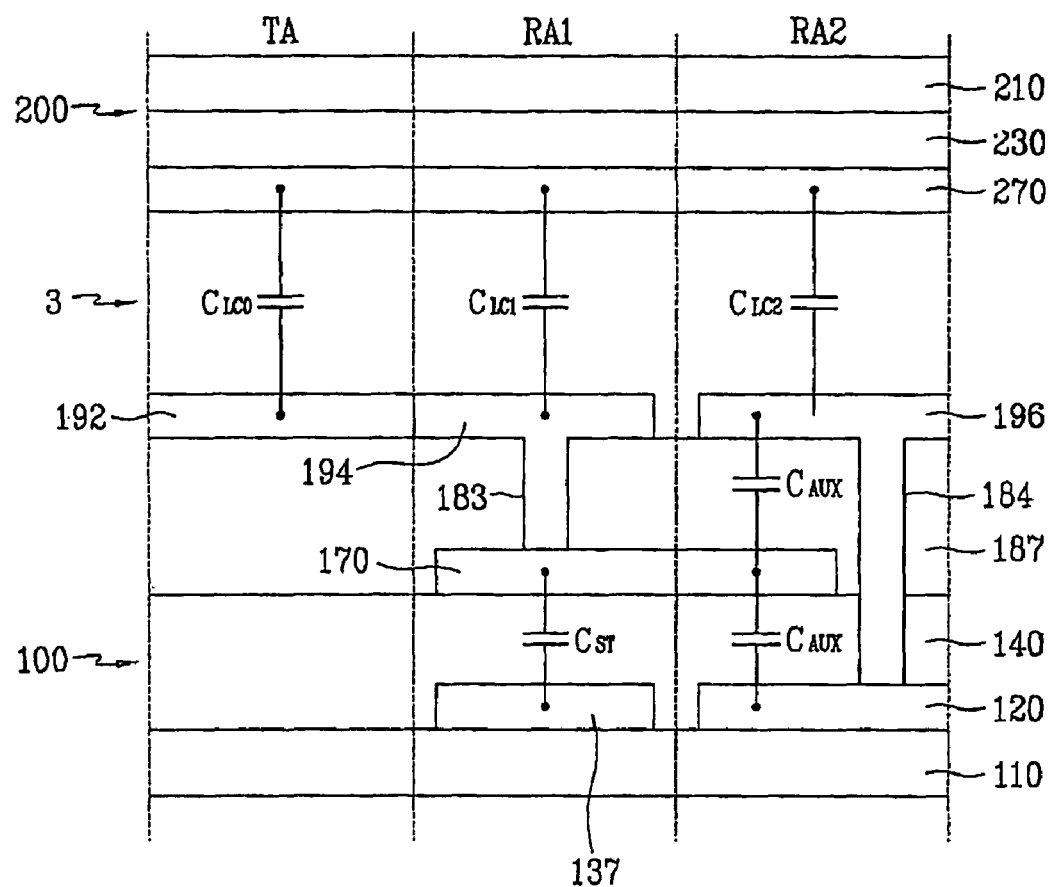
FIGS. 4 and 5 are other exemplary sectional views of the exemplary LCD shown in FIG. 2, respectively.
Figure 5:
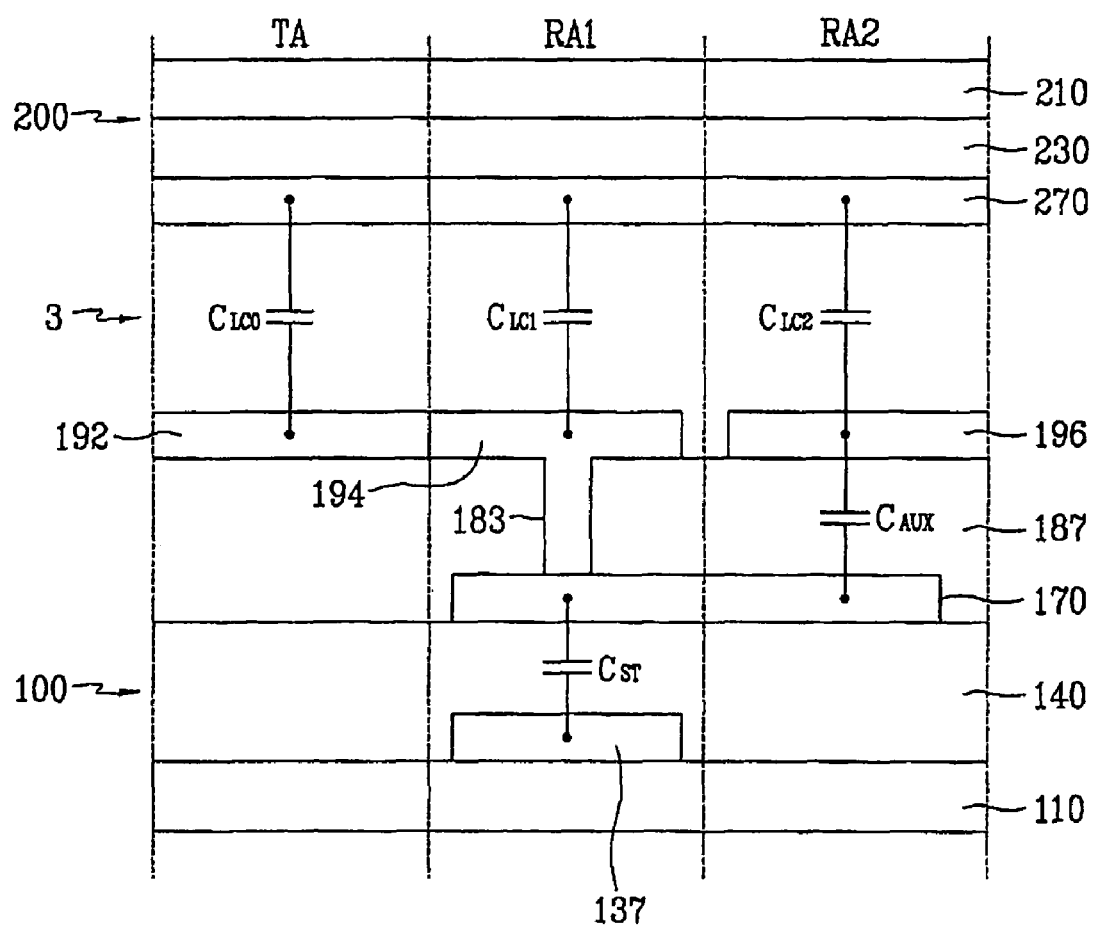

FIG. 3 is an exemplary sectional view of the exemplary LCD shown in FIG. 2, and FIGS. 4 and 5 are other exemplary sectional views of exemplary embodiments of the LCD shown in FIG. 2, respectively.

FIGS. 3 to 5 depict sectional views of exemplary LCDs according to exemplary embodiments of the present invention.

Referring to FIG. 3, a TFT array panel 100 has a storage electrode 137 formed on an insulating substrate 110, a gate insulating layer 140 covering the storage electrode 137 and exposed portions of the insulating substrate 110, and an output electrode 170 of a switching element Q formed on the gate insulating layer 140. A storage capacitor $C_{ST}$ is formed between the storage electrode 137 and the output electrode 170, which overlaps the storage electrode 137. A first insulating layer 187a is formed on the output electrode 170 and exposed portions of the gate insulating layer 140 and has a contact hole 183 exposing a portion of the output electrode 170.

A transmissive electrode 192 is formed on the first insulating layer 187a and is physically and electrically connected to the output electrode 170 through the contact hole 183. The second insulating layer 187b is formed on a portion of the transmissive electrode 192 and is disposed within first and second reflective regions RA1 and RA2. The second insulation layer 187b may have an embossed surface. First and second reflective electrodes 194 and 196 are formed on the second insulating layer 187b. The first reflective electrode 194 is partially formed on the transmissive electrode 192 and is thereby connected to the transmissive electrode 192. The first reflective electrode 194 is separated from the second reflective electrode 196.

An auxiliary capacitor $C_{AUX}$ is formed between the transmissive electrode 192 and the second reflective electrode 196. The second insulating layer 187b is interposed between the transmissive electrode 192 and the second reflective electrode 196.

A common electrode panel 200 includes a color filter 230 formed on an insulating substrate 210 and a common electrode 270 formed on the color filter 230. In one exemplary embodiment, red, green, and blue color filters 230 may be arranged in on regions of the insulating substrate 210 corresponding to adjacent pixels. An LC layer 3 is interposed between the TFT array panel 100 and the common electrode panel 200.

A transmissive LC capacitor $C_{LC0}$ includes the common electrode 270 and the transmissive electrode 192 as two terminals, and the LC layer 3 functions as an insulator of the transmissive LC capacitor $C_{LC0}$. First and second reflective LC capacitors $C_{LC1}$ and $C_{LC2}$ include the first and second reflective electrodes 194 and 196 and the common electrode 270, as two terminals, respectively, and at this time the LC layer 3 functions as an insulator of the first and second reflective LC capacitors $C_{LC1}$ and $C_{LC2}$ as well.

An auxiliary capacitor $C_{AUX}$ includes the transmissive electrode 192 and the second reflective electrode 196 overlapping the transmissive electrode 192 via the second insulating layer 187b. A height difference between the transmissive region TA and the first and second reflective regions RA1 and RA2 occurs because of a thickness of the second insulating layer 187b.

Another exemplary embodiment of layered structures of an exemplary LCD according to an exemplary embodiment of the present invention will be described with reference to FIG. 4.

Referring to FIG. 4, a TFT array panel 100 has a storage electrode 137 and an auxiliary electrode 120 formed on an insulating substrate 110, and a gate insulating layer 140 formed on the storage electrode 137 and the auxiliary electrode 120, as well as on exposed portions of the insulating substrate 110. An output electrode 170 of a switching element Q is formed on the gate insulating layer 140, and overlaps the storage electrode 137 and the auxiliary electrode 120. A storage capacitor $C_{ST}$ includes the storage electrode 137 and the output electrode 170, which overlaps the storage electrode 137, and an auxiliary capacitor $C_{AUX}$ is formed between the auxiliary electrode 120 and the output electrode 170, which overlaps the auxiliary electrode 120 via the gate insulating layer 140. A portion of the auxiliary electrode 120 may be exposed through an opening in the gate insulating layer 140.

An insulating layer 187 is formed on the output electrode 170 and on exposed portions of the gate insulating layer 140. The insulating layer 187 may have an embossed surface. The insulating layer 187 has a contact hole 183 exposing a portion of the output electrode 170, and the gate insulating layer 140 and the insulating layer 187 has a contact hole 184 exposing a portion of the auxiliary electrode 120.

A transmissive electrode 192, and first and second reflective electrodes 194 and 196 are formed on the insulating layer 187, and may be formed during a same manufacturing step of the LCD. The first reflective electrode 194 is physically and electrically connected to the output electrode 170 through the contact hole 183 and is connected to the transmissive electrode 192. The second reflective electrode 196 is physically and electrically connected to the auxiliary electrode 120 through the contact hole 184, but is separated from the first reflective electrode 194.

A common electrode panel 200 includes a color filter 230 formed on an insulating substrate 210 and a common electrode 270 formed on the color filter 230. In one exemplary embodiment, red, green, and blue color filters 230 may be arranged in on regions of the insulating substrate 210 corresponding to adjacent pixels. An LC layer 3 is interposed between the TFT array panel 100 and the common electrode panel 200. In particular, the LC layer 3 is in contact with the common electrode 270 and the transmissive electrode 192, the first reflective electrode 194, and the second reflective electrode 196.

A transmissive LC capacitor $C_{LC0}$ includes the common electrode 270 and the transmissive electrode 192 as two terminals, and the LC layer 3 functions as an insulator of the transmissive LC capacitor $C_{LC0}$. First and second reflective LC capacitors $C_{LC1}$ and $C_{LC2}$ include the first and second reflective electrodes 194 and 196 and the common electrode 270, as two terminals, respectively, and at this time the LC layer 3 functions as an insulator of the first and second reflective LC capacitors $C_{LC1}$ and $C_{LC2}$ as well.

Auxiliary capacitors $C_{AUX}$ are formed between the auxiliary electrode 120 and the output electrode 170, which overlaps the auxiliary electrode 120 via the gate insulating layer 140 and between the output electrode 170 and the second reflective electrode 196, which overlaps the output electrode 170 via the insulating layer 187. Unlike FIG. 3, in transmissive region TA, and first and second reflective regions RA1 and RA2, the cell gaps are substantially equal to each other thereby simplifying a manufacturing process and preventing a disclination in an image by eliminating a high step between transmissive and reflective regions.

Another exemplary embodiment of layered structures of an exemplary LCD according to an exemplary embodiment of the present invention will be described with reference to FIG. 5.

Referring to FIG. 5, a TFT array panel 100 has a storage electrode 137 formed on an insulating substrate 110, and a gate insulating layer 140 formed on the storage electrode 137 and on exposed portions of the insulating substrate 110. An output electrode 170 of a switching element Q is formed on the gate insulating layer 140. A storage capacitor $C_{ST}$ includes the storage electrode 137 and the output electrode 170, which overlaps the storage electrode 137, An insulating layer 187 is formed on the output electrode 170 and on exposed portions of the gate insulating layer 140. The insulating layer 187 may have an embossed surface. The insulating layer 187 has a contact hole 183 exposing a portion of the output electrode 170.

A transmissive electrode 192 and first and second reflective electrodes 194 and 196 are formed on the insulating layer 187 within a same layer of the LCD. The first reflective electrode 194 is physically and electrically connected to the output electrode 170 through the contact hole 183, and is connected to the transmissive electrode 192. The first reflective electrode 194 is separated from the second reflective electrode 196.

A common electrode panel 200 includes a color filter 230 formed on an insulating substrate 210 and a common electrode 270 formed on the color filter 230, such as one of a plurality of red, green, and blue color filters formed in each pixel region of the LCD. An LC layer 3 is interposed between the TFT array panel 100 and the common electrode panel 200, such that the LC layer 3 contacts the common electrode 270 and the transmissive electrode 192 and the first and second reflective electrodes 194, 196.

A transmissive LC capacitor $C_{LC0}$ includes the common electrode 270 and the transmissive electrode 192 as two terminals, and the LC layer 3 functions as an insulator of the transmissive LC capacitor $C_{LC0}$. First and second reflective LC capacitors $C_{LC1}$ and $C_{LC2}$ include the first and second reflective electrodes 194 and 196 and the common electrode 270, as two terminals, respectively, and at this time the LC layer 3 functions as an insulator of the first and second reflective LC capacitors $C_{LC1}$ and $C_{LC2}$ as well.

Auxiliary capacitors $C_{AUX}$ are formed between each output electrode 170 and each second reflective electrode 196, which overlaps the output electrode 170 via the insulating layer 187. As in the exemplary embodiment illustrated in FIG. 4, in transmissive region TA, and first and second reflective regions RA1 and RA2, the cell gaps are substantially equal to each other.

Figure 6:
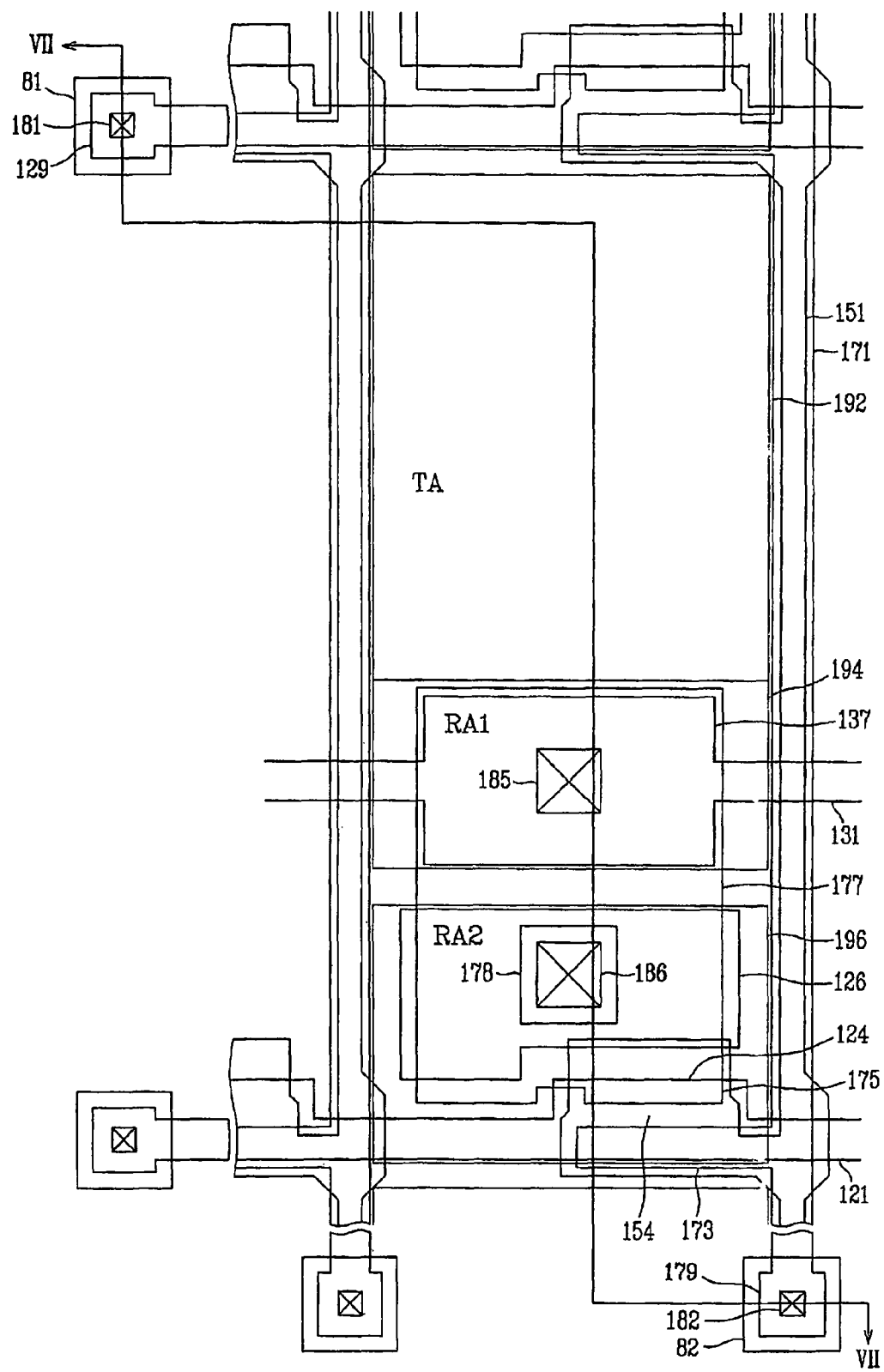
FIG. 6 is a layout view of an exemplary embodiment of the exemplary LCD shown in FIG. 4.
Figure 7:
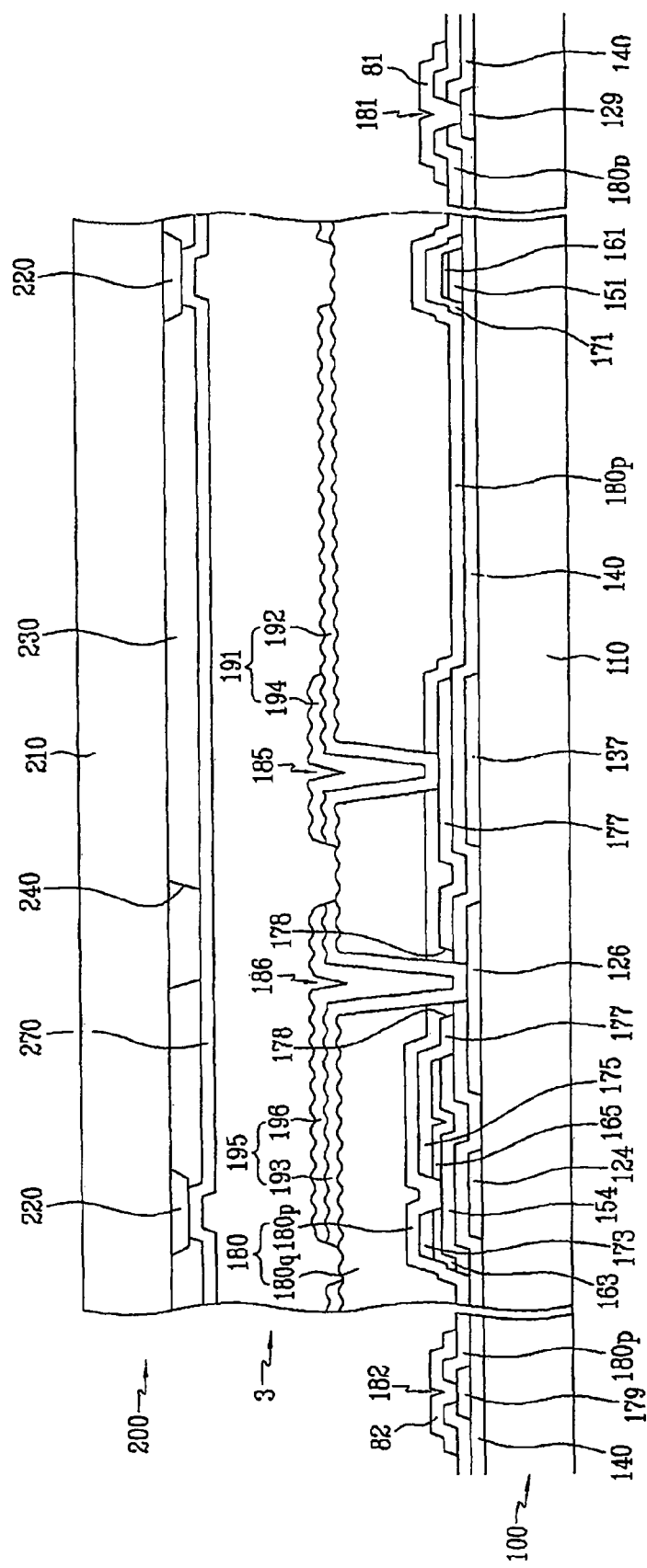
FIG. 7 is a sectional view taken along line VII-VII of FIG. 6.

Referring to FIGS. 6 and 7, an exemplary embodiment of an exemplary LCD according to an exemplary embodiment of the present invention will be described.

FIG. 6 is a layout view of an exemplary embodiment of the exemplary LCD shown in FIG. 4, and FIG. 7 is a sectional view taken along line VII-VII of FIG. 6.

The LCD includes a TFT array panel 100, a common electrode panel 200 facing the TFT array panel 100, and an LC layer 3 interposed between the panels 100 and 200.

First, the TFT array panel 100 will be described.

A plurality of gate lines 121, storage electrode lines 131, and auxiliary electrodes 126 are formed on an insulating substrate 110 made of a material such as, but not limited to, transparent glass or plastic.

The gate lines 121 transmit gate signals and extend substantially parallel to each other in a transverse direction. Each of the gate lines 121 includes a plurality of gate electrodes 124 projecting upward, towards a pixel region in a direction substantially perpendicular to the transverse direction, and an end portion 129 having a large area for contact with another layer or an external driving circuit. A gate driving circuit (not shown) for generating the gate signals may be mounted on a flexible printed circuit ("FPC") film (not shown), which may be attached to the substrate 110, directly mounted on the substrate 110, or integrated with the substrate 110. The gate lines 121 may extend to be connected to a driving circuit that may be integrated on the substrate 110.

The storage electrode lines 131 are supplied with a predetermined voltage and extend substantially parallel to the gate lines 121. Each of the storage electrode lines 131 is disposed between two adjacent gate lines 121 and is closer to a lower gate line 121 of the two adjacent gate lines 121. In other words, the storage electrode lines 131 unevenly divide each pixel region. Each of the storage electrode lines 131 includes a plurality of storage electrodes 137 expanding upward and downward, that is, in directions towards both adjacent gate lines 121. Alternatively, the storage electrode lines 131 may have various shapes and arrangements.

Each auxiliary electrode 126 is disposed between the gate line 121 including the gate electrode 124 and the storage electrode line 131 and is separated from the is gate line 121 and the storage electrode line 131 by predetermined distances.

The gate lines 121, the storage electrode lines 131, and the auxiliary electrodes 126 are preferably made of an aluminum Al-containing metal such as Al and an Al alloy, a silver Ag-containing metal such as Ag and a Ag alloy, a copper Cu-containing metal such as Cu and a Cu alloy, a molybdenum Mo-containing metal such as Mo and a Mo alloy, chromium Cr, tantalum Ta, or titanium Ti. However, the gate lines 121, the storage electrode lines 131, and the auxiliary electrodes 126 may have a multi-layered structure including two conductive films (not shown) having different physical characteristics. In such a multi-layered structure, one of the two films is preferably made of a low resistivity metal including an Al-containing metal, a Ag-containing metal, and a Cu-containing metal for reducing signal delay or voltage drop, while another film is preferably made of a material such as a Mo-containing metal, Cr, Ta, or Ti, which has good physical, chemical, and electrical contact characteristics with other materials such as indium tin oxide ("ITO") or indium zinc oxide ("IZO"). Acceptable examples of the combination of the two films include a lower Cr film and an upper Al (alloy) film and a lower Al (alloy) film and an upper Mo (alloy) film. While particular exemplary embodiments have been described, it should be understood that the gate lines 121, the storage electrode lines 131, and the auxiliary electrodes 126 may be made of various metals or conductors.

The lateral sides of the gate lines 121, the storage electrode lines 131, and the auxiliary electrodes 126 are inclined relative to a surface of the substrate 110, and the inclination angles thereof are in a range of about 30 to about 80 degrees.

A gate insulating layer 140 preferably made of, but not limited to, silicon nitride (SiNx) or silicon oxide (SiOx) is formed on the gate lines 121, the storage electrode lines 131, and the auxiliary electrodes 126. The gate insulating layer 140 may be further formed on exposed portions of the insulating substrate 110.

A plurality of semiconductor stripes 151 preferably made of hydrogenated amorphous silicon (abbreviated to "a-Si") or polysilicon are formed on the gate insulating layer 140. Each of the semiconductor stripes 151 extends substantially in the longitudinal direction, substantially perpendicular to the transverse direction of the gate lines 121, and includes a plurality of projections 154 branched out toward the gate electrodes 124. The semiconductor stripes 151 become wide near the gate lines 121 such that the semiconductor stripes 151 cover large areas of the gate lines 121.

A plurality of ohmic contact stripes and islands 161 and 165 are formed on the semiconductor stripes 151. The ohmic contact stripes and islands 161 and 165 are preferably made of n+ hydrogenated a-Si heavily doped with an n-type impurity such as phosphorous, or they may be made of silicide. Each ohmic contact stripe 161 includes a plurality of projections 163, and the projections 163 and the ohmic contact islands 165 are located in pairs on the projections 154 of the semiconductor stripes 151, and the projections 163 are spaced from the ohmic contact islands 165, thereby forming channel regions over the projections 154.

The lateral sides of the semiconductor stripes 151 and the ohmic contacts 161 and 165 are inclined relative to the surface of the substrate 110, and the inclination angles thereof are preferably in a range of about 30 to about 80 degrees.

A plurality of data lines 171 and a plurality of drain electrodes 175 separate from the data lines 171 are formed on the ohmic contacts 161 and 165 and the gate insulating layer 140.

The data lines 171 transmit data signals and extend substantially in the longitudinal direction to intersect the gate lines 121 and the storage electrode lines 131. Each data line 171 includes a plurality of source electrodes 173 projecting toward the gate electrodes 124, and an end portion 179 having a large area for contact with another layer or an external driving circuit. A data driving circuit (not shown) for generating the data signals may be mounted on an FPC film (not shown), which may be attached to the substrate 110, directly mounted on the substrate 110, or integrated with the substrate 110. The data lines 171 may extend to be connected to a driving circuit that may be integrated with the substrate 110.

The drain electrodes 175 are disposed opposite the source electrodes 173 with respect to the gate electrodes 124. The drain electrodes 175 overlap the ohmic contact islands 165 and the source electrodes 173 overlap the ohmic contact projections 163. Each of the drain electrodes 175 has an expansion 177 overlapping the storage electrode 137, the auxiliary electrode 126, and the gate electrode 124. The expansion 177 has a rectangular shape and includes a concave portion adjacent the gate line 121. The expansion 177 has an opening 178 exposing the auxiliary electrode 126.

A gate electrode 124, a source electrode 173, and a drain electrode 175 along with a projection 154 of a semiconductor stripe 151 form a TFT having a channel formed in the projection 154 disposed between the source electrode 173 and the drain electrode 175, as well as between the ohmic contact projection 163 and the ohmic contact island 165.

The data lines 171 and the drain electrodes 175 are preferably made of a refractory metal such as Cr, Mo, Ta, Ti, or alloys thereof. Alternatively, they may have a multilayered structure including a refractory metal film (not shown) and a low resistivity film (not shown). Acceptable examples of such a multi-layered structure include a double-layered structure having a lower Cr/Mo (alloy) film and an upper Al (alloy) film, and a triple-layered structure of a lower Mo (alloy) film, an intermediate Al (alloy) film, and an upper Mo (alloy) film. While particular exemplary embodiments are described, it should be understood that the data lines 171 and the drain electrodes 175 may be made of various metals or conductors.

The data lines 171 and the drain electrodes 175 preferably have inclined edge profiles, and the inclination angles thereof range from about 30 to about 80 degrees.

The ohmic contacts 161 and 165 are interposed only between the underlying semiconductor stripes 151 and the overlying conductors 171 and 175 thereon and reduce the contact resistance therebetween. Although the semiconductor stripes 151 are narrower than the data lines 171 at most places, the width of the semiconductor stripes 151 becomes large near the gate lines 121 as described above, to smooth the profile of the surface, thereby preventing the disconnection of the data lines 171. The semiconductor stripes 151 include some exposed portions, which are not covered with the data lines 171 and the drain electrodes 175, such as portions of the projections 154 located between the source electrodes 173 and the drain electrodes 175.

A passivation layer 180 is formed on the data lines 171, the drain electrodes 175, and the exposed portions of the semiconductor stripes 151, as well as on exposed portions of the gate insulating layer 140. The passivation layer 180 includes a lower passivation film 180p disposed on the data lines 171, the drain electrodes 175, the exposed portions of the semiconductor stripes 151, and exposed portions of the gate insulating layer 140 and preferably made of an inorganic insulator such as silicon nitride or silicon oxide, and an upper passivation film 180q disposed on the lower passivation film 180p and preferably made of an organic insulator. Preferably, the upper passivation film 180q may have dielectric constant of less than about 4.0, and photosensitivity. The upper passivation film 180q may have an embossed surface. Alternatively, the passivation layer 180 may have a single-layer structure preferably made of an inorganic or organic insulator.

The upper passivation film 180q is removed on the end portions 129 and 179 of the gate lines 121 and the data lines 171, respectively, to expose the lower passivation film 180p.

The passivation layer 180 has a plurality of contact holes 182 and 185 exposing the end portions 179 of the data lines 171 and the expansion portions 177 of the drain electrodes 175, respectively. The passivation layer 180 and the gate insulating layer 140 have a plurality of contact holes 181 exposing the end portions 129 of the gate lines 121 and a plurality of contact holes 186 exposing the auxiliary electrodes 126. Each of the contact holes 186 is formed in the opening 178 of the expansion portion 177 of the drain electrode 175 and is separated from the boundary of the opening 178 with a sufficient gap therebetween.

A plurality of first and second pixel electrodes 191 and 195 and a plurality of contact assistants 81 and 82 are formed on the passivation layer 180.

The first and second pixel electrodes 191 and 195 are separated from each other and are curved along the embossed surface of the upper passivation film 180q. That is, the first and second pixel electrodes 191 and 195 have the same uneven upper surface as does the upper passivation film 180q. Each of the first pixel electrodes 191 includes a transmissive electrode 192 and a first reflective electrode 194 thereon, and each of the second pixel electrodes 195 includes a transmissive electrode 193 and a second reflective electrode 196 thereon. The first reflective electrode 194 is disposed on only a portion of the transmissive electrode 192, thereby exposing a remaining portion of the transmissive electrode 192. However, the second reflective electrode 196 covers an entire surface of the transmissive electrode 193. The transmissive electrodes 192 and 193 are preferably made of a transparent conductor such as ITO or IZO, and the reflective electrodes 194 and 196 are preferably made of a reflective conductor such as Ag, Al, Cr, or alloys thereof.

Alternatively, the reflective electrodes 194 and 196 may have a double-layered structure including an upper reflective film having low resistivity, such as Al, Ag, or alloys thereof, and a lower film made of a Mo-containing metal, Cr, Ta, or Ti, which has good contact characteristics with ITO or IZO.

As shown in FIG. 6, each pixel has a transmissive region TA and first and second reflective regions RA1 and RA2. In particular, the transmissive region TA is at the upper and lower areas of a portion where the transmissive electrode 192 is exposed by removing the first reflective electrode 194, the first reflective region RA1 is at the upper and lower areas of the first reflective electrode 194, and the second reflective region RA2 is at the upper and lower areas of the second reflective electrode 196.

In one pixel, the transmissive region TA, the first reflective region RA1, and the second reflective region RA2 are sequentially disposed from a previous gate line 121. As shown in FIG. 7, the cell gap is substantially uniform in the whole region of a pixel throughout the transmissive region TA and the first and second reflective regions RA1 and RA2.

The first pixel electrodes 191 are physically and electrically connected to the expansion 177 of the drain electrodes 175 through the contact holes 185 such that the first pixel electrodes 191 receive data voltages from the drain electrodes 175. In particular, the transmissive electrode 192 directly contacts the expansion 177 through the contact hole 185. The first pixel electrodes 191 that are supplied with the data voltages generate electric fields in cooperation with a common electrode 270 of the common electrode panel 200 that is supplied with a common voltage, which determine the orientations of LC molecules (not shown) of an LC layer 3 disposed between the two electrodes 191 and 270 to adjust polarization of the incident light passing through the LC layer 3.

An exposed transmissive electrode 192 and the common electrode 270 form a transmissive LC capacitor $C_{LC0}$ and the first reflective electrode 194 and the common electrode 270 form a first reflective LC capacitor $C_{LC1}$, which store applied voltages after the TFT is turned off.

A first pixel electrode 191 and an expansion 177 of a drain electrode 175 connected thereto overlap the storage electrode line 131 including the storage electrode 137. The pixel electrode 191, a drain electrode 175 connected thereto, and the storage electrode line 131 form a storage capacitor $C_{ST}$, respectively, which enhances the voltage storing capacity of the LC capacitors $C_{LC0}$ and $C_{LC1}$.

The expansion 177 of the drain electrode 175 overlaps the auxiliary electrode 126 and the second pixel electrode 195, to form an auxiliary capacitor $C_{AUX}$. The second pixel electrodes 195 receive voltages that are lower than the data voltages from the drain electrodes 175 due to the auxiliary capacitors $C_{AUX}$.

The second pixel electrodes 195 are physically and electrically connected to the auxiliary electrode 126 through the contact holes 186, where the transmissive electrode 193 is in direct contact with the auxiliary electrode 126, such that the second pixel electrodes 195 receive voltages that are lower than the data voltage though the auxiliary capacitors $C_{AUX}$.

The second pixel electrodes 195 that are supplied with the voltages that are lower than the data voltages generate electric fields in cooperation with the common electrode 270, which reorient the LC molecules in the LC layer 3 interposed therebetween. The second reflective LC capacitor $C_{LC2}$ is formed between the second pixel electrodes 195 and the common electrode 270 and the second reflective LC capacitor $C_{LC2}$ is connected to the auxiliary capacitor $C_{AUX}$ in series.

In the transmissive region TA, incident light from the rear side of the LCD, i.e., the TFT array panel 100, penetrates to the front side of the LCD, i.e., to the common electrode panel 200, while passing through the LC layer 3 to display images. In the reflective regions RA1 and RA2, light that is incident through the front side of the LCD, i.e. from the common electrode panel 200, passes through the LC layer 3 and is then reflected by the first and second reflective electrodes 194 and 196 to penetrate the LC layer 3 again, and it then passes from the front side again to display images. Reflective efficiency of light is enhanced by the embossed surfaces of the reflective electrodes 194 and 196.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

A description of the common electrode panel 200 follows.

A light blocking member 220, referred to as a black matrix, for preventing light leakage is formed on an insulating substrate 210 made of a material such as, but not limited to, transparent glass or plastic.

The light blocking member 220 has a plurality of openings (not shown) that face the first and second pixel electrodes 191 and 195 and prevent light leakage between two adjacent pixels.

A plurality of color filters 230 are also formed on the substrate 210, and they are disposed substantially in the areas enclosed by the light blocking member 220. The color filters 230 may extend substantially in the longitudinal direction on regions of the substrate 210 that correspond to regions along the pixel electrodes 191 and 195. The color filters 230 may each represent one of the primary colors such as red, green, and blue colors.

Each of the color filters 230 in the reflective regions RA1 and RA2 includes light holes 240. The light holes 240 compensate a difference in color tone between the reflective regions RA1 and RA2 and the transmissive region TA due to a difference of the number of light rays transmitting through the color filters 230. Alternatively, the difference of color tone may be compensated by changing the thicknesses of the color filters 230 in the transmissive region TA and the reflective regions RA1 and RA2. Fillers are filled in the light holes 240 for planarization of surfaces of the color filters 230, thereby reducing the height difference due to the light holes 240.

A common electrode 270 is formed on the color filters 230 and the light blocking members 220. The common electrode 270 is preferably made of a transparent conductive material such as, but not limited to, ITO or IZO.

Alignment layers (not shown) may be coated on inner surfaces of the panels 100 and 200, and polarizers (not shown) may be provided on outer surfaces of the panels 100 and 200. The polarizers may adjust a transmission direction of light externally provided into the panels 100, 200, respectively, in accordance with an aligned direction of the liquid crystal layer 3. The polarizers may have first and second polarized axes thereof substantially perpendicular to each other.

The LC layer 3 is subjected to vertical alignment or horizontal alignment.

A plurality of spacers (not shown) may be formed between the TFT array panel 100 and the common electrode panel 200, to form a predetermined gap therebetween.

Also, the TFT array panel 100 and the common electrode panel 200 of the LCD may be sealed with a sealant. The sealant is disposed on the boundary of the common electrode panel 200.

Next, another exemplary embodiment of an exemplary LCD according to an exemplary embodiment of the present invention will be described with reference to FIGS. 8 and 9.

Figure 8:
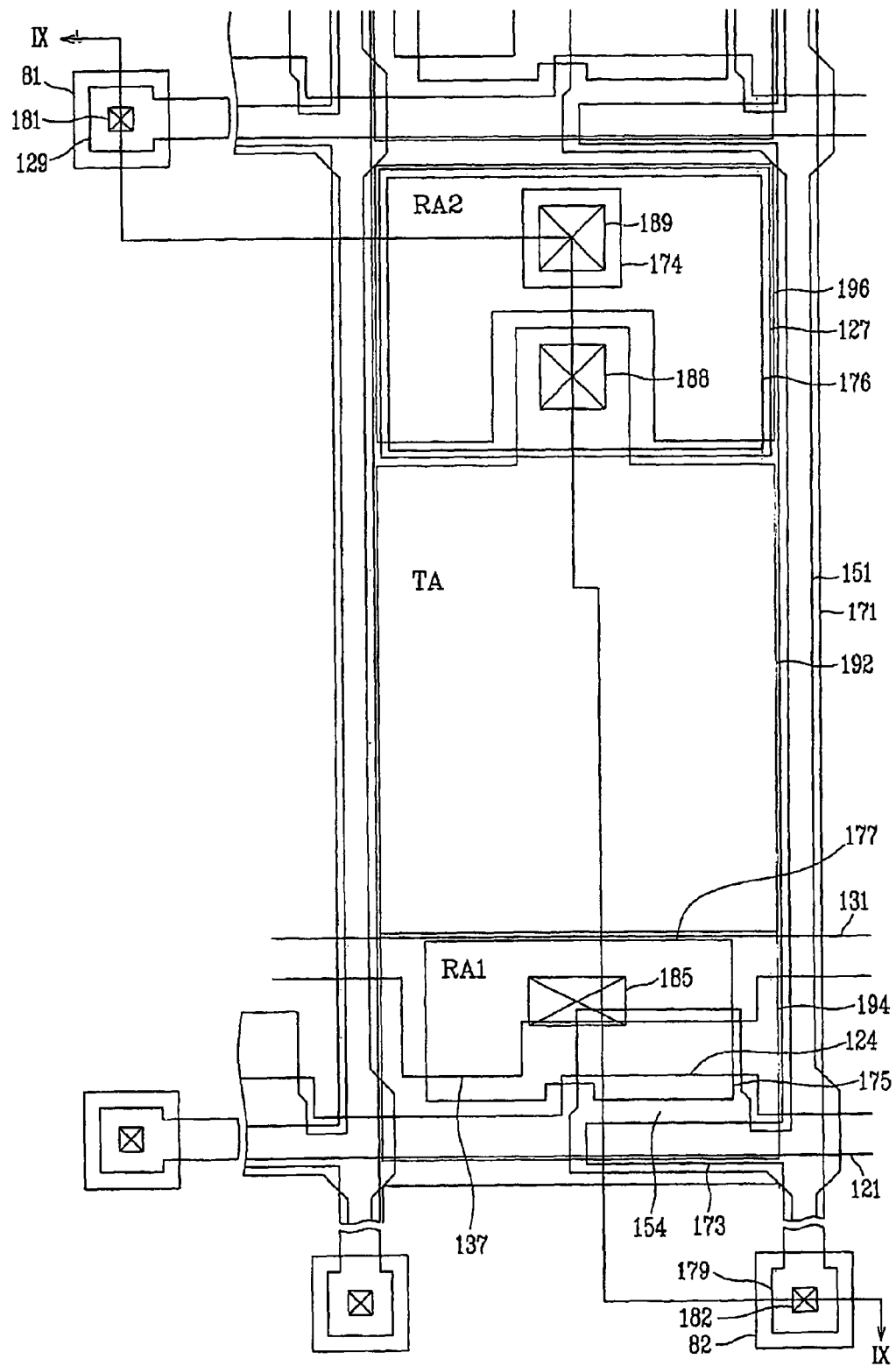
FIG. 8 is a layout view of another exemplary embodiment of the exemplary LCD shown in FIG. 4.
Figure 9:
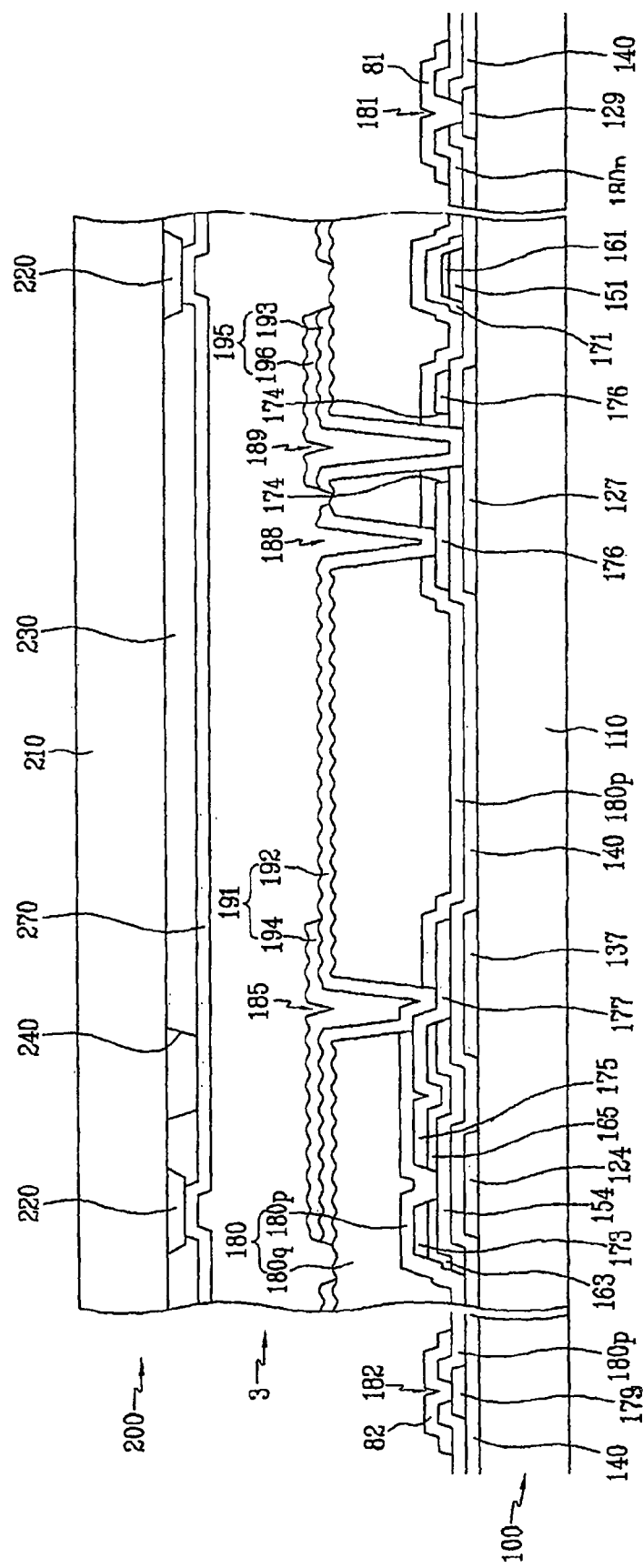
FIG. 9 is a sectional view taken along line IX-IX of FIG. 8.

FIG. 8 is a layout view of another exemplary embodiment of the exemplary LCD shown in FIG. 4, and FIG. 9 is a sectional view taken along line IX-IX of FIG. 8. Referring to FIGS. 8 and 9, layered structures of the TFT array panel 100 and the common electrode panel 200 according to this exemplary embodiment are substantially the same as those shown in FIGS. 6 and 7, and therefore like reference numerals will be used to refer to like elements.

As in the prior embodiment, the LCD includes a TFT array panel 100, a common electrode panel 200 facing the TFT array panel 100, and an LC layer 3 interposed between the panels 100 and 200.

First, the TFT array panel 100 will be described below.

A plurality of gate lines 121 including a plurality of gate electrodes 124 and end portions 129, a plurality of storage electrode lines 131 including storage electrodes 137, and a plurality of first auxiliary electrodes 127 are formed on an insulating substrate 110.

The storage electrode 137 is positioned very close to the lower of two adjacent gate lines 121, and the first auxiliary electrode 127 is separated from the storage electrode 137 and is positioned very close to the upper of two adjacent gate lines 121. The first auxiliary electrodes 127 are made of the same metal as that used for forming the gate lines 121 and the storage electrode lines 131, and may have a multi-layered structure.

A gate insulating layer 140, a plurality of semiconductor stripes 151 including a plurality of projections 154, and a plurality of ohmic contact stripes 161 and islands 165 are sequentially formed on the gate lines 121, the storage electrode lines 131, the first auxiliary electrodes 127, and exposed portions of the substrate 110.

A plurality of data lines 171 including source electrodes 173 and end portions 179, a plurality of drain electrodes 175 including expansions 177 and spaced from the data lines 171, and a plurality of second auxiliary electrodes 176 are formed on the ohmic contacts 161 and 165 and the gate insulating layer 140.

The second auxiliary electrodes 176 are separated from the data lines 171 and the drain electrodes 175, and have almost the same planner shape as the first auxiliary electrodes 127 and overlay the first auxiliary electrodes 127. Each of the second auxiliary electrodes 176 includes an opening 174. The second auxiliary electrodes 176 are made of the same metal as that of the data lines 121 and the drain electrodes 175, and may have a multi-layered structure.

A passivation layer 180 including a lower passivation film 180p and an upper passivation film 180q is formed sequentially on the data lines 171, the drain electrodes 175, and the exposed portions of the semiconductor stripes 151, as well as on exposed portions of the gate insulating layer 140. A plurality of contact holes 182, 185, and 188 are provided through the passivation layer 180 exposing the end portions 179 of the data lines 171, the expansions 177 of the drain electrodes 175, and the second auxiliary electrodes 176, respectively, and a plurality of contact holes 181 and 189 are provided through the passivation layer 180 and the gate insulating layer 140 exposing the end portions 129 of the gate lines 121 and the first auxiliary electrodes 126, respectively. Different from the TFT array panel of FIGS. 6 and 7, a plurality of contact holes 188 are provided at the passivation layer 180 exposing the second auxiliary electrodes 176 and a plurality of contact holes 189 are provided at the passivation layer 180 and the gate insulating layer 140 exposing the first auxiliary electrodes 126. The contact holes 189 are formed through the openings 174 of the second auxiliary electrodes 176 and are separated from the boundaries of the openings 174 with a sufficient gap therebetween.

A plurality of first and second pixel electrodes 191 and 195 and a plurality of contact assistants 81 and 82 are formed on the passivation layer 180.

The first and second pixel electrodes 191 and 195 are separated from each other and may be curved along the embossed surface of the upper passivation film 180q. Each of the first pixel electrodes 191 includes a transmissive electrode 192 and a first reflective electrode 194 thereon, and each of the second pixel electrodes 195 includes a transmissive electrode 193 and a second reflective electrode 196 thereon. The first reflective electrode 194 is disposed on only a portion of the transmissive electrode 192, thereby exposing a remaining portion of the transmissive electrode 192. However, the second reflective electrode 196 covers an entire surface of the transmissive electrode 193.

As shown in FIG. 8, each pixel has a transmissive region TA, and first and second reflective regions RA1 and RA2. In particular, the transmissive region TA is at the upper and lower areas of a portion where the transmissive electrode 192 is exposed by removing the first reflective electrode 194, the first reflective region RA1 is at the upper and lower areas of the first reflective electrode 194, and the second reflective region RA2 is at the upper and lower areas of the second reflective electrode 196. Different from the TFT array panel shown in FIGS. 6 and 7, the first reflective region RA1 is disposed opposite the second reflective region RA2 with respect to the transmissive region TA. That is, the first and second reflective regions RA1 and RA2 are separated by the transmissive region TA. As shown in FIG. 9, the cell gaps are equal to each other in the transmissive region TA and the first and second reflective regions RA1 and RA2.

The first pixel electrodes 191 are physically and electrically connected to the expansion 177 of the drain electrodes 175 through the contact holes 185 such that the first pixel electrodes 191 receive data voltages from the drain electrodes 175. In particular, the transmissive electrode 192 directly contacts the expansion 177 through the contact hole 185. An exposed transmissive electrode 192 and the common electrode 270 form a transmissive LC capacitor $C_{LC0}$, and the first reflective electrode 194 and the common electrode 270 form a first reflective LC capacitor $C_{LC1}$.

As illustrated in FIG. 8, each of the transmissive electrodes 192 includes a protrusion projecting toward the second reflective region RA2. The protrusions of the transmissive electrodes 192 are physically and electrically connected to the second auxiliary electrodes 176 through the contact holes 188 such that the transmissive electrodes 192 receive data voltages from the second auxiliary electrodes 176. The second reflective electrode 196 in the second reflective region RA2 includes a concavity shaped to surround the protrusion of the transmissive electrode 192.

The second auxiliary electrode 176 overlaps the first auxiliary electrode 127 and is overlapped by the second pixel electrode 195, to form an auxiliary capacitor $C_{AUX}$, respectively. The second pixel electrodes 195 receive voltages that are lower than the data voltages from the second auxiliary electrodes 176 since the data voltages are divided by the auxiliary capacitors $C_{AUX}$.

The second pixel electrodes 195 are physically and electrically connected to the first auxiliary electrode 127 through the contact holes 189 such that the second pixel electrodes 195 receive voltages that are lower than the data voltage received though the auxiliary capacitors $C_{AUX}$.

The second reflective LC capacitor $C_{LC2}$ is formed between the second pixel electrodes 195 and the common electrode 270, and the second reflective LC capacitor $C_{LC2}$ is connected to the auxiliary capacitor $C_{AUX}$ in series.

The common electrode panel 200 will now be described.

In the common electrode panel 200, a light blocking member 220, referred to as a black matrix, a plurality of color filters 230, and a common electrode 270 are formed on an insulating substrate 210. The color filters 230 include light holes 240. A detailed description of elements of the LCD of FIGS. 8 and 9 that are the same as elements of the LCD of FIGS. 6 and 7 will be omitted.

Methods of making a voltage-reflection curve coincide with a voltage-transmittance curve will be described with reference to FIG. 10.

Figure 10:
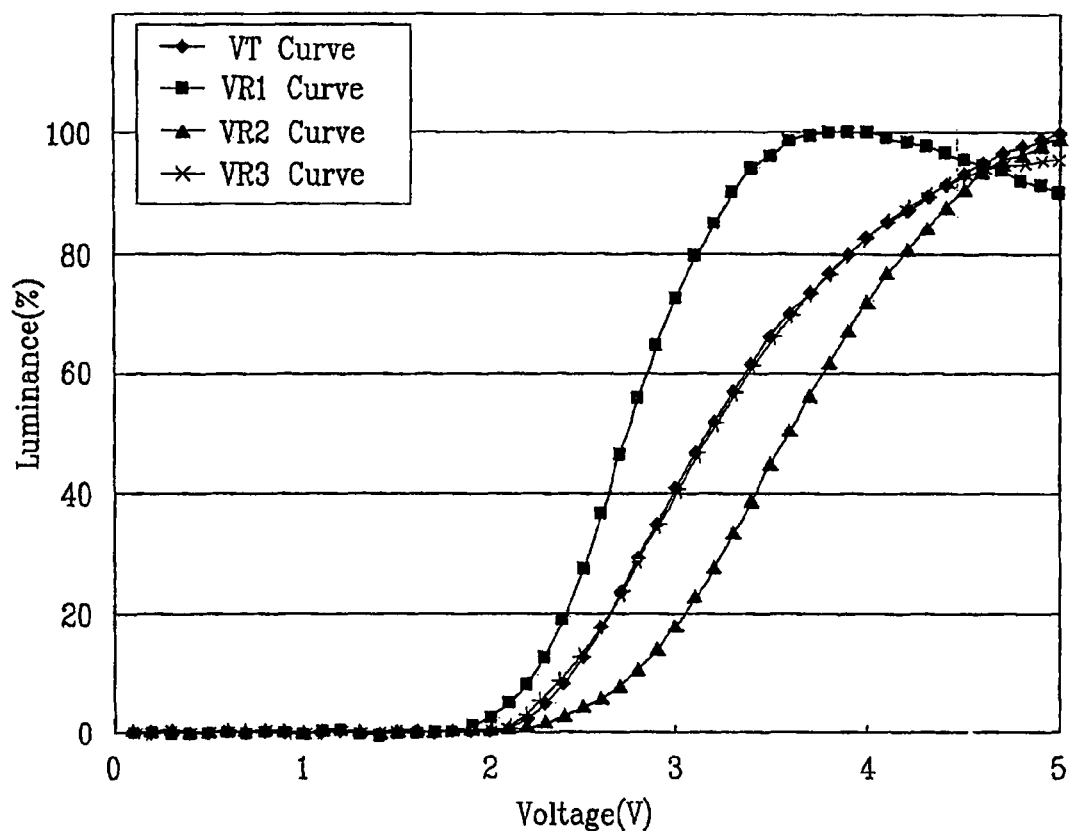
FIG. 10 shows a graph illustrating a voltage-transmittance curve and voltage-reflection curves of an exemplary LCD according to an exemplary embodiment of the present invention.

FIG. 10 shows a graph illustrating a voltage-transmittance curve and voltage-reflection curves of an exemplary LCD according to an exemplary embodiment of the present invention.

When a data voltage from a data driver (not shown) corresponding to an image signal is applied to the transmissive electrode 192 and the first reflective electrode 194 through the switching element Q via the data line 171, a voltage difference V (e.g. a pixel voltage) between the data voltage and the common voltage Vcom is formed between the two terminals of the transmissive LC capacitor $C_{LC0}$ and the first reflective LC capacitor $C_{LC1}$. However, a voltage difference V2 that is smaller than the pixel voltage V is formed between the two terminals of the second reflective LC capacitor $C_{LC2}$ due to the auxiliary capacitor $C_{AUX}$. As described above, the second pixel electrodes 195 receive voltages that are lower than the data voltages since the data voltages are divided by the auxiliary capacitors $C_{AUX}$. The voltage difference V2 is described by the following Equation 1.

$$V2 = \frac{C_{AUX}}{(C_{AUX} + C_{LC2})} V \qquad \text{[Equation 1]}$$

Each of the capacitors $C_{AUX}$ and $C_{LC2}$ and the capacitance thereof are denoted by the same reference characters.

The voltage-transmittance curve VT shown in FIG. 10 represents variation of luminance in the transmissive region TA with respect to variation of the pixel voltage V, and the first voltage-reflection curve VR1 represents variation of luminance in the reflective region RA with respect to variation of the pixel voltage V. The voltage-transmittance curve VT and the first voltage-reflection curve VR1 are obtained based on measured data from test panels. In the test panel, the reflective region RA has only one reflective region, that is, the first reflective region RA1, enlarged to the second reflective region RA2. The second voltage-reflection curve VR2 is obtained based on data generated by calculating data of the first reflection curve VR1 using Equation 1. The third voltage-reflection curve VR3 is obtained by synthesizing the first voltage-reflection curve VR1 and second voltage-reflection curve VR2. The resulting curves VT, VR1, and VR2 in FIG. 10 are defined by area ratio of the first reflective region RA1 and the second reflective region RA2.

When the first voltage-reflection curve VR1, the second voltage-reflection curve VR2, and the third voltage-reflection curve VR3 are respectively represented by functions R1(V), R2(V), and R3(V), the function R3(V) is obtained through Equation 2 below.

$$R3(v) = (1 - AR) \cdot RA1(V) + AR \cdot RA2(V) \qquad \text{[Equation 2]}$$
$$= (1 - AR) \cdot RA1(V) + AR \cdot RA1(kV)$$

Here, $$AR = \frac{A2}{(A1 + A2)},$$
$$k = \frac{C_{AUX}}{(C_{AUX} + C_{LC2})}$$

and A1 and A2 represent areas of the first and second reflective regions RA1 and RA2, respectively. That is, AR represents an area ratio of the second reflective region RA2 with respect to the whole reflective region, and k represents a voltage ratio of the voltage V2 across the second reflective LC capacitor $C_{LC2}$ with respect to the pixel voltage V.

A simulation was performed by varying the area ratio AR and the voltage ratio k to achieve a third voltage-reflection curve VR3, which is most similar to the voltage-transmittance curve VT.

Referring to the result of the simulation, when the area ratio AR ranges from about 0.4 to about 0.7 and the voltage ratio k ranges from about 0.69 to about 0.77, the third voltage-reflection curve VR3 is closest to the voltage-transmittance curve VT. However, the above numerical values may be varied in accordance with various factors defining transmittance, reflexibility, etc., and therefore other simulations may be performed to achieve the third voltage-reflection curve VR3, which is most similar to the voltage-transmittance curve VT.

The capacitance of the auxiliary capacitor $C_{AUX}$ for causing the voltage ratio k to be about 0.73 is calculated by the following Equation 3.

$$0.73 = C_{AUX}/(C_{AUX} + C_{LC2})$$ [Equation 3]

$$C_{AUX} = 2.7 C_{LC2}$$

That is, the capacitance of the auxiliary capacitor $C_{AUX}$ becomes 2.7 times the capacitance of the second reflective LC capacitor $C_{LC2}$. The desired capacitance of the auxiliary capacitor $C_{AUX}$ is obtained by adjusting the size of the auxiliary capacitor $C_{AUX}$, a dielectric constant, a thickness of a dielectric, etc.

An LCD for making voltage-reflection curves of a pixel representing red ("R pixel"), a pixel representing green ("G pixel"), and a pixel represent blue ("B pixel"), respectively coincide with each other will be described with reference to FIG. 10 and FIGS. 11 to 13. The R, G, and B pixels represent pixels having a red filter, a green filter, and a blue filter for the color filters 230, respectively.

Figure 11:
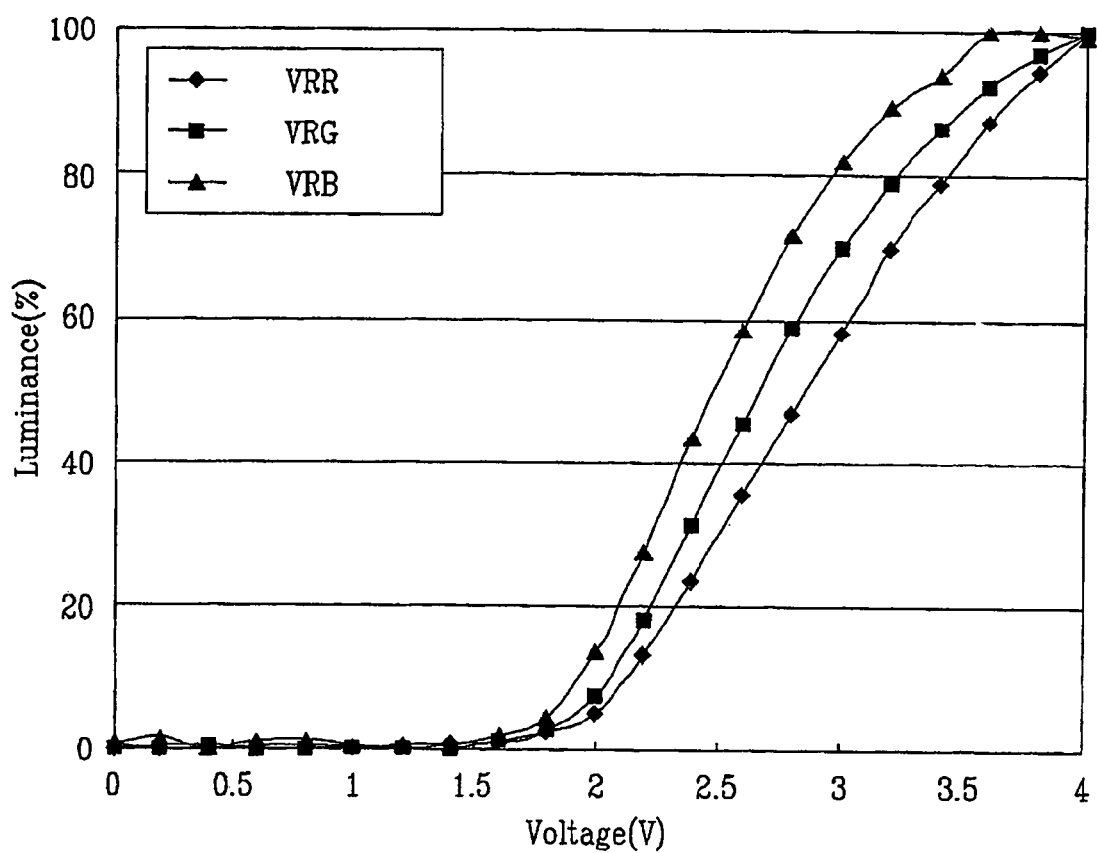
FIG. 11 shows a graph illustrating voltage-reflection curves when the area ratios of reflection areas with respect to R, G, and B pixels, respectively, are substantially the same as each other in an exemplary LCD according to an exemplary embodiment of the present invention.
Figure 12:
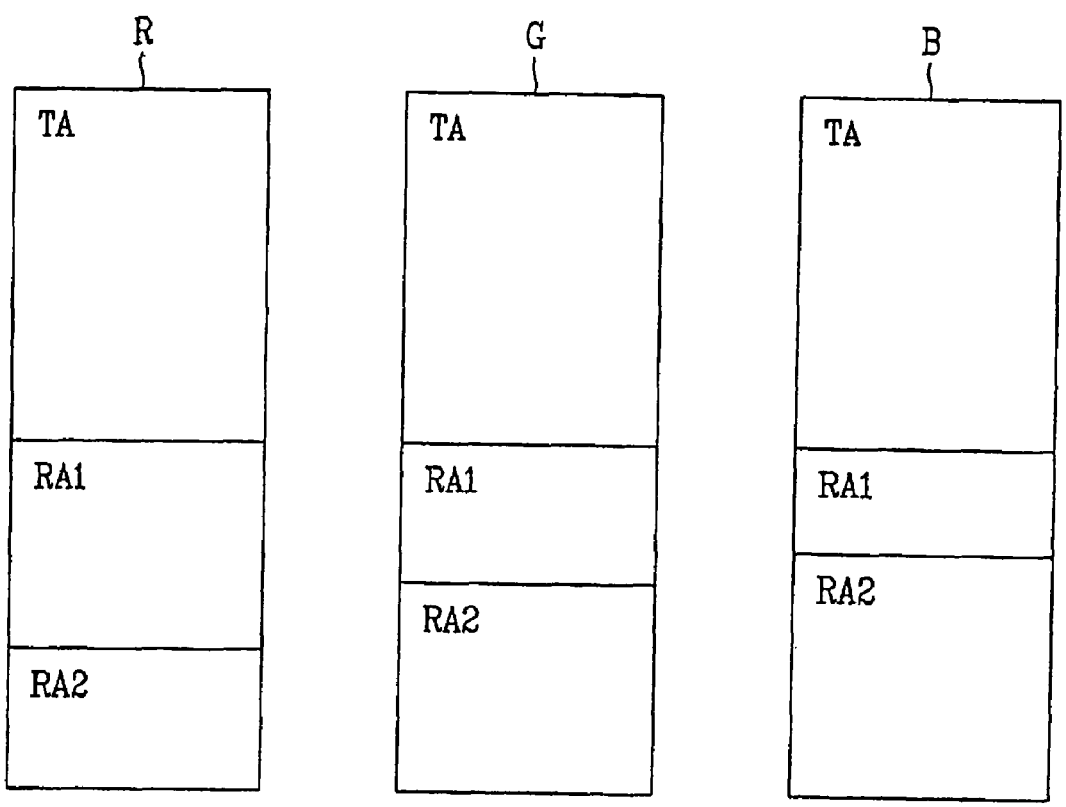
FIG. 12 is a schematic diagram of an exemplary LCD according to an exemplary embodiment of the present invention.
Figure 13:
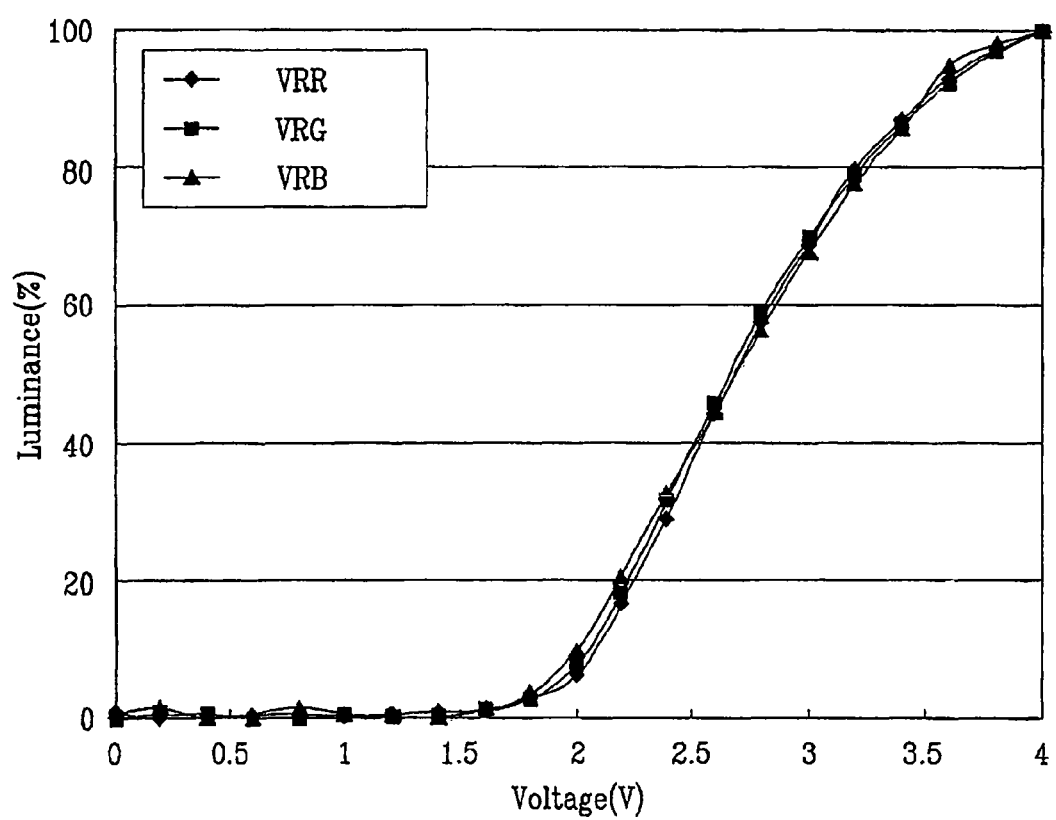
FIG. 13 shows a graph illustrating voltage-reflection curves of R, G, and B pixels when the areas ratios of reflection areas with respect to the R, G, and B pixels, respectively are different from each other in the exemplary LCD shown in FIG. 12.

FIG. 11 shows a graph illustrating voltage-reflection curves when the area ratios of reflection areas with respect to R, G, and B pixels, respectively, are the same as each other in an exemplary LCD according to an exemplary embodiment of the present invention, FIG. 12 is a schematic diagram of an exemplary LCD according to an exemplary embodiment of the present invention, and FIG. 13 shows a graph illustrating voltage-reflection curves of R, G, and B pixels when the areas ratios of reflection areas with respect to the R, G, and B pixels, respectively, are different from each other in the exemplary LCD shown in FIG. 12.

Voltage-reflection curves VRR, VRG, and VRB shown in FIG. 11 represent voltage-reflection curves obtained by synthesizing voltage-reflection curves (not shown) with respect to respective first and second reflective regions RA1 and RA2 of each of the R, G, and B pixels when the area ratios AR of the first and second reflective regions RA1 and RA2 with respect to the R, G, and B pixels are equal to each other, respectively. As shown in FIG. 11, the voltage-reflection curves VRR, VRG, and VRB are different from each other. Reflexibility is a function with respect to wavelength. Therefore, when the same voltage is applied to the R, G, and B pixels, respectively, reflexibiltiy of the B pixel is largest due to the blue light included in a short wavelength range, and reflexibiltiy of the R pixel is smallest due to the red light included in a long wavelength range. The voltage-reflection curve VRB with respect to the B pixel is located at the left side of the voltage-reflection curve VRG with respect to the G pixel, and the voltage-reflection curve VRR with respect to the R pixel is located at the right side of the voltage-reflection curve VRG. The voltage-reflection curves VR1, VR2, and VR3 shown in FIG. 10 are voltage-reflection curves with respect to the total of the R, G, and B pixels rather than each of the R, G, and B pixels. The voltage-reflection curves VR1, VR2, and VR3 shown in FIG. 10 differ from the voltage-reflection curves VRR, VRG, and VRB shown in FIG. 11 because of changed simulation parameters such as characteristics of the LC layer 3, the area of the transmissive region TA, etc.

Referring to FIG. 12, the sizes of the first and second reflective regions RA1 and RA2 with respect to each of the R, G, and B pixels are different from each other. Thereby, the area ratios AR of the second reflective region RA2 with respect to the total reflective region RA of each of the R, G, and B pixels are different from each other, and specifically, the area ratio AR of the second reflective region RA2 of the B pixel is the largest and the area ratio AR of the second reflective region RA2 of R pixel is the smallest. However, the area ratios AR of the total reflective region RA with respect to the transmissive region TA of each of the R, G, and B pixels are equal to each other.

According to FIG. 12, since the size of the second reflective region RA2 of the B pixel is relatively larger than the first reflective region RA1 of the B pixel, the voltage-reflection curve VRB moves right, and since the size of the first reflective region RA1 of the R pixel is relatively larger than the second reflective region RA2 of the R pixel, the voltage-reflection curve VRR moves left. As a result, the voltage-reflection curves VRR, VRG, and VRB coincide with each other by properly adjusting the area ratios AR of each of the R, G, and B pixels.

As a result of simulation, when the voltage ratio k is 0.70 and the area ratios AR of the R, G, and B pixels are 0.43, 0.6, and 0.72, respectively, the voltage-reflection curves VRR, VRG, and VRB coincide with each other as shown in FIG. 13. Of course, the voltage-reflection curves VRR, VRG, and VRB coincide with the voltage-transmittance curves of each of the R, G, and B pixels.

The capacitance of the auxiliary capacitor $C_{AUX}$ may be different with each R. G, and B pixel. The voltage ratio k of the voltage V2 across the second reflective LC capacitor $C_{LC2}$ with respect to the pixel voltage V may be varied based on the capacitance of the auxiliary capacitor $C_{AUX}$, and thereby the voltage-reflection curves VRR, VRG, and VRB may coincide with each other. The area ratio AR and the voltage ratio k with respect to each of the R, G, and B pixels may be different from each other, respectively.

As above-described, the color filters 230 may filter one of the three colors such as red, green, and blue, but alternately, the three colors may be yellow, cyan, and magenta. In this case, the area ratios AR of the reflective areas with respect to total areas of each of three pixels are different from each other.

According to exemplary embodiments of the present invention, each reflective region is divided into two sub-regions. A data voltage is applied to one of the two sub-regions and a voltage that is lower than the data voltage is applied to the other sub-region. Thereby, an LCD having gamma curves of the reflective mode and the transmissive mode coinciding with each other and having a substantially uniform cell gap is provided.

By changing the area ratio of the reflective region in each R, G, and B pixel, the voltage-reflection curves of each of the R, G, and B pixels coincide with each other, and thereby uniform images are obtained without regard to the transmissive mode and reflective mode.

Although exemplary embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A thin film transistor array panel, comprising:
    a substrate;
    first and second transmissive electrodes formed on the substrate;
    first and second reflective electrodes connected to the first and second transmissive electrodes, respectively; and
    third and fourth reflective electrodes separated from the first and second transmissive electrodes and the first and second reflective electrodes,
    wherein a first area ratio of the first reflective electrode to the third reflective electrode is different from a second area ratio of the second reflective electrode to the fourth reflective electrode, and
    the first transmissive electrode, the first reflective electrode and the third reflective electrode are disposed within a first pixel region, and the second transmissive electrode, the second reflective electrode, and the fourth reflective electrode are disposed within a second pixel region.

2. The thin film transistor array panel of claim 1, wherein a total size of the first and third reflective electrodes is substantially equal to a total size of the second and fourth reflective electrodes.

3. The thin film transistor array panel of claim 1, further comprising:
    a third transmissive electrode formed on the substrate;
    a fifth reflective electrode connected to the third transmissive electrode; and
    a sixth reflective electrode separated from the third transmissive electrode and the fifth reflective electrode,
    wherein a third area ratio of the fifth reflective electrode to the sixth reflective electrode is different from the first area ratio and the second area ratio, and
    the third transmissive electrode, the fifth reflective electrode and the sixth reflective electrode are disposed within a third pixel region.

4. The thin film transistor array panel of claim 3, wherein a total size of the fifth and sixth reflective electrodes is substantially equal to a total size of the first and third reflective electrodes and a total size of the second and fourth reflective electrodes.

5. The thin film transistor array panel of claim 1, wherein at least one of the transmissive electrodes, the first reflective electrode, and a first conductor connected to the transmissive electrodes and the first reflective electrode overlaps the third reflective electrode or a second conductor connected to the third reflective electrode.

6. The thin film transistor array panel of claim 5, further comprising an insulating layer formed between the first transmissive electrodes and the third reflective electrode and between the second transmissive electrode and the fourth reflective electrode.

7. The thin film transistor array panel of claim 5, further comprising a first insulating layer formed between the first and second conductors overlapping each other.

8. The thin film transistor array panel of claim 7, further comprising a second insulating layer formed between the first and third reflective electrodes and the first conductor.

9. The thin film transistor array panel of claim 5, further comprising an insulating layer formed between the first and third reflective electrodes overlapping each other.

10. The thin film transistor array panel of claim 1, wherein a data voltage is applied to the first and second reflective electrodes, and a voltage lower than the data voltage is applied to the third and fourth reflective electrodes.

11. The thin film transistor array panel of claim 1, wherein a cell gap of the thin film transistor array panel in a transmissive region and in a reflective region is substantially same.

* * * * *